United States Patent
Haj' Nashat et al.

(10) Patent No.: US 11,357,216 B2
(45) Date of Patent: Jun. 14, 2022

(54) METHODS FOR PROMOTING PRODUCTION OF FEMALE EMBRYOS IN EGGS

(71) Applicant: N.R SOOS TECHNOLOGY LTD., Kaukab Abu al-Hija (IL)

(72) Inventors: Mohamad Haj' Nashat, Kaukab Abu al-Hija (IL); Gadi Itshak Demer, Kibutz Dvira (IL)

(73) Assignee: N.R SOOS TECHNOLOGY LTD., Kaukab Abu Al-Hija (IL)

(*) Notice: Subject to any disclaimer, the term of this patent is extended or adjusted under 35 U.S.C. 154(b) by 436 days.

(21) Appl. No.: 16/288,918

(22) Filed: Feb. 28, 2019

(65) Prior Publication Data

US 2019/0191672 A1 Jun. 27, 2019

Related U.S. Application Data

(63) Continuation-in-part of application No. PCT/IL2018/050419, filed on Apr. 12, 2018.
(Continued)

(51) Int. Cl.
*A01K 41/00* (2006.01)
*A01K 41/02* (2006.01)
(Continued)

(52) U.S. Cl.
CPC .......... *A01K 41/023* (2013.01); *A01K 41/04* (2013.01); *A01K 41/06* (2013.01); *A01K 45/007* (2013.01)

(58) Field of Classification Search
CPC ...... A01K 41/023; A01K 41/04; A01K 41/06; A01K 45/007
See application file for complete search history.

(56) References Cited

U.S. PATENT DOCUMENTS 3,382,846 A 5/1968 Roncari et al.
5,251,574 A 10/1993 Foster et al.
(Continued)

FOREIGN PATENT DOCUMENTS

CN 105961221 A 9/2016
EP 0675678 10/1995
(Continued)

OTHER PUBLICATIONS

Sanyal T, Kumar V, Nag TC, Jain S, Sreenivas V, Wadhwa S (Jul. 5, 2013) "Prenatal Loud Music and Noise: Differential Impact on Physiological Arousal, Hippocampal Synaptogenesis and Spatial Behavior in One Day-Old Chicks", PLOS One 8(7): e67347, https://doi.org/10.1371/journal.pone.0067347.*
(Continued)

*Primary Examiner* — Kathleen I Alker
(74) *Attorney, Agent, or Firm* — The Roy Gross Law Firm, LLC; Roy Gross

(57) ABSTRACT

The present invention relates to a method for promoting production of female embryos in fertilized eggs, comprising steps of: incubating said eggs; generating at least one type of energy with a predetermined energy profile; and simultaneously generating a pre-determined profile of a non-energy parameter by means of an energy generation device, applying both energy profile and the non-energy parameter to the eggs; and, collecting the eggs; wherein said method is non-toxic to the embryos, the application of both the energy profile and the non-energy parameter increases the fraction of females in the hatched chicks.

16 Claims, 5 Drawing Sheets

Related U.S. Application Data

(60) Provisional application No. 62/485,025, filed on Apr. 13, 2017.

(51) Int. Cl.
*A01K 41/04* (2006.01)
*A01K 45/00* (2006.01)
*A01K 41/06* (2006.01)

(56) References Cited

U.S. PATENT DOCUMENTS

| | | | | |
|---|---|---|---|---|
| 2012/0058052 A1* | 3/2012 | Decuypere | ........... | A01K 45/007 424/9.6 |
| 2016/0183499 A1* | 6/2016 | Grajcar | ................. | A01K 67/02 119/318 |

FOREIGN PATENT DOCUMENTS

| | | | | |
|---|---|---|---|---|
| JP | 2004537982 | A | | 12/2004 |
| WO | 2010088742 | A1 | | 8/2010 |
| WO | WO-2010088742 | A1 * | 8/2010 | ............. G06Q 99/00 |

OTHER PUBLICATIONS

Veterany et al., The influence of ultrasound on chicken hatching. Die Bodenkultur, Dec. 31, 2002.
International Search Report PCT/IL2018/050419 Completed Aug. 12, 2018; dated Aug. 12, 2018 4 pages.
Written Opinion of the International Searching Authority PCT/IL2018/050419 dated Aug. 12, 2018 5 pages.
Goth et al (2005) Temperature-dependent sex ratio in a bird, Biology letters 1.1:31-33; Retrieved Aug. 3, 2021 doi:10.1098/rsbl.2004.0247.
Bowles et al. (1991) The Effects of High-Amplitude Impulsive Noise on Hatching Success: A reanalysis of the Sooty Tern Incident, Hubbs/Seaworld Research Institute. Retrieved Aug. 3, 2021 from: https://www.researchgate.net/publication/235132698_The_Effects_of_High-Amplitude_Impulsive_Noise_on_Hatching_Success_A_reanalysis_of_the_Sooty_Tern_Incident.
Henriksen et al. (2011) Elevated Plasma Corticoserone Decreases Yolk Testosterone and Progesterone in Chickens: Linking Maternal Stress and Hormone-Dediated Maternal Effects, PLoSOne, vol. 6, Issue 8. Retrieved Aug. 3, 2021; https://doi.org/10.1371/journal.pone.0023824.
Is it possible to change a chicken's sex before it hatches? (2021) The Guardian. Retrieved from: https://www.theguardian.com/food/2021/jan/31/good-vibrations-sound-waves-eggs-ethical-slaughter-male-chicks.
Bowles et al. (1991). The Effects of High-Amplitude Impulsive Noise on Hatching Success: A reanalysis of the Sooty Tern Incident. Hubb Marine Research Center, BNN Laboratories, Inc.
Sanayl et al. (2013). Prenatal Loud Music and Noise: Differential Impact on Physiological Arousal, Hippocampal Synaptogenesis and Spatial Behavior in One-Day Old Chicks. vol. 8 (7). PLoS One Jul. 5, 2013;8(7):e67347. doi: 10.1371/journal.pone.0067347.
Henriksen et al. (2011). Elevated Plasma Corticosterone Decreases Yold Testosterone and Progesterone in Chickens: Linking Maternal Stress and Hormone-Mediated Maternal Effects. PLos One; vol. 6 (8). https://doi.org/10.1371/journal.pone.0023824.

* cited by examiner

METHODS FOR PROMOTING PRODUCTION OF FEMALE EMBRYOS IN EGGS

CROSS-REFERENCE TO RELATED APPLICATIONS

This application is a Continuation-in-Part of PCT Patent Application No. PCT/IL2018/050419 having International filing date of Apr. 12, 2018, which claims the benefit of priority from U.S. 62/485,025 filed on Apr. 13, 2017. The contents of the above applications are all incorporated by reference as if fully set forth herein in their entirety.

FIELD OF THE INVENTION

The current invention generally pertains to a method for promoting production of female embryos in eggs.

BACKGROUND OF THE INVENTION

The natural proportion of gender of chicken is generally given by the ratio of males to females of 1:1, see Kaleta, E. F., & Redmann, T. (2008). Approaches to determine the sex prior to and after incubation of chicken eggs and of day-old chicks. *World's poultry science journal*, 64(3), 391-399.; Feng, Y. P., et al. (2006). Analysis of the offspring sex ratio of chicken by using molecular sexing. *Agricultural Sciences in China*, 5(7), 545-549, specifically page 548; and see Pearl, R. (1917). The sex ratio in the domestic fowl. *Proceedings of the American Philosophical Society*, 56(5), 416-436; specifically page 548; which are incorporated herein as a reference The process of final shaping of gender is mainly influenced by a genotype composition of the zygote, and only minor evidence exists regarding the effect of other inner and outer factors, like corticosteroids or the uncertain role of temperature, regarding determining sex ratio; see Amslam, M. A., Groothuis, T. G., Smits, M. A., & Woelders, H. (2014). Effect of corticosterone and hen body mass on primary sex ratio in laying hen (*Gallus gallus*), using unincubated eggs. *Biology of reproduction*, 90(4), 76-1; Goth, A., & Booth, D. T. (2005). Temperature-dependent sex ratio in a bird. *Biology letters*, 1(1), 31-33; and see Collins, K. E., et al. (2013). No evidence of temperature-dependent sex determination or sex-biased embryo mortality in the chicken. *Poultry science*, 92(12), 3096-3102; which are incorporated herein as a reference.

As examples of such inner and outer factors are the impact of ultrasound from the outside during incubation, sound, and vibration, which can alter the gender proportions in non-human animals.

There are several cases of means to alter the gender proportion and favoring one gender; some of these are natural means and several are experimental means and methods. However, the majority of these later cases have revealed the opposite ratio (i.e. majority of males) and other teach against by disclosing harmful effects such as reduction in growth and reproduction rates.

DMRT1 DMRT1 (Doublesex and Mab-3 Related Transcription Factor, #1) encodes a conserved transcription factor with an essential role in gonadal function. This gene encodes the DM domain, a transcription factor with a conserved DNA-binding motif. DMRT1 is highly expressed in the developing gonads of male embryos, from fishes through to reptiles, birds and mammals. In the chicken, DMRT1 is located on the Z sex chromosome and is currently the best candidate master regulator of avian gonadal sex differentiation. Knockdown of DMRT1 expression during the period of sexual differentiation induces feminization of male embryonic chicken gonads. This gene is therefore necessary for proper testis development in the chicken. Additionally, over-expression of DMRT1 induces male pathway genes and antagonizes the female pathway in embryonic chicken gonads. Ectopic DMRT1 expression in female gonads induces localized SOX9 and AMH expression. It also induces expression of the recently identified Z-linked male factor, Hemogen (HEMGN). Masculinized gonads show evidence of cord-like structures and retarded female-type cortical development. Furthermore, expression of the critical feminizing enzyme, aromatase, is reduced in the presence of over-expressed DMRT1. These data indicate that DMRT1 is an essential sex-linked regulator of gonadal differentiation in avians, and that it likely acts via a dosage mechanism established through the lack of global Z dosage compensation in birds, see Lambeth, L., et al. (2014). Over-expression of DMRT1 induces the male pathway in embryonic chicken gonads. *Developmental Biology*, 389(2), 160-172, incorporated herein as reference.

Domestic chickens produce eggs that contain at almost equal proportions female and male embryos. However, growers do not need male chicks, as they cannot lay eggs. The growth of males for meat is not economically worthwhile, since their growth rate is slow, and their breast size is relatively small compared with that of meat-type varieties. Therefore, male chicks are hatched, and these male chicks are destroyed.

Deviation of the general population from the equilibrium of 50:50 gender ratio, by favoring female embryos, can offer economic gain by reproducing laying female chickens in favor of non-laying males. In addition, the effect of a higher percentage of female hatching will prevent the practice of male chicken euthanizing and assist avoiding economic and environmental problems, as a result of the need to incinerate a large amount of biological material.

There is a long felt need for a safe and harmless system and method for producing a majority of female embryos in fertilized eggs.

SUMMARY OF THE INVENTION

It is thus one object of the present invention to disclose a method for promoting production of female embryos of fertilized eggs, the method comprising steps of
 a. incubating the eggs;
 b. by means of an energy generation device, generating at least one type of energy with a predetermined energy profile; and simultaneously generating a pre-determined profile of a non-energy parameter;
 c. applying the energy profile and the non-energy parameter to the eggs; and,
 d. harvesting the eggs';
wherein the method is non-toxic to the embryos, further wherein application of both the application profile and the non-energy parameter increases the fraction of females in the hatched chicks.

It is another object of the invention to disclose a method as defined above, the method comprising steps of
 a. incubating the eggs;
 b. by means of an energy generation device, generating at least one type of energy with a predetermined energy profile; and simultaneously generating a pre-determined profile of a non-energy parameter;

c. applying the energy profile and the non-energy parameter to the eggs; and,
d. harvesting the eggs';

wherein the method is non-toxic to the embryos, further wherein application of both the application profile and the non-energy parameter increases the fraction of females in the hatched chicks.

It is another object of the invention to disclose a method as defined above, wherein the energy profile and non-energy profiles are characterized by:
a. alternating humidity in a range of αA to βB, α ranges from 0.85-1.25; β ranges from 0.73-1.35; A/B ratio ranges from 34 to 65%, from 92% to 42%, from 86% to 26% or from 63% to 12%;
b. alternating temperature in a range of 35.9 C to 37.9 C;
c. for days 3-15, alternating sound frequency (±50 Hz) wherein sound frequency equals=$0.0032*day^6-0.1428*day^5+2.5087*day^4-22.139*day^3+104.69*day^2-255.88*day+866.22$;
d. alternating sound intensity in a range of 19 to 42 dB; and
e. tilting the eggs in a first range of 30° to 60°, and a second range of once every 60 min. to 150 mins.

It is another object of the invention to disclose a method as defined above, wherein the energy profile and non-energy profiles are characterized by
a. alternating humidity in a range of αA to βB, α ranges from 0.85-1.25; β ranges from 0.73-1.35; A/B ratio ranges from 34 to 65%, from 92% to 42%, from 86% to 26% or from 63% to 12%;
b. alternating temperature in a range of 35.9 C to 37.9 C;
c. for days 3-13, alternating sound frequency (±50 Hz) wherein sound frequency equals $-0.0554\, day^6+2.6917\, day^5-52.609\, day^4+527.75\, day^3-2850.3\, day^2+7794.1\, day-7792.3$;
d. alternating sound intensity in a range of 19 to 42 dB; and
e. tilting the eggs in a first range of 30° to 60°, and a second range of once every 60 min. to 150 mins.

It is another object of the invention to disclose a method as defined above, wherein the energy profile is at least one parameter selected from a group consisting intensity of the energy, duration of the energy, frequency of pulses of the energy, duty cycle, shape of the pulse, number of pulses per a group, number of group of pulses, duration of the group, wavelength of a pulse, wavelength of the energy, shape of the group, and any combination thereof.

It is another object of the invention to disclose a method as defined above, wherein the non-energy parameter is selected from a group consisting of humidity, temperature, energy emission profile, eggs' tilting, eggs rolling, shelves' spacing and any combination thereof It is another object of the invention to disclose a method as defined above, wherein the emission profile is at least one selected from a group consisting of continuous, interrupted, and any combination thereof.

It is another object of the invention to disclose a method as defined above, wherein the shape of the pulse is at least one selected from a group consisting of a sinusoidal wave, a square wave, a saw-tooth wave, sinusoid-like wave, a triangle wave, a descending wave, an elevating wave, a multivariable wave, propagating longitudinal waves comprising alternating compressions and rarefactions and any combination thereof.

It is another object of the invention to disclose a method as defined above, wherein the shape of the group of pulses is at least one selected from a group consisting of a sinusoidal wave, a square wave, a saw-tooth wave, sinusoid-like form, a triangle wave, a decreasing intensity wave, an increasing intensity wave, a multivariable wave and any combination thereof.

It is another object of the invention to disclose a method as defined above, wherein the energy is one of acoustic vibration, physical vibration, light and any combination thereof.

It is another object of the invention to disclose a method as defined above, wherein the duration of the group is in a range of 0 hours to 48 hours.

It is another object of the invention to disclose a method as defined above, wherein all of the groups are applied on a day in a range of day 1 to day 14 of incubation.

It is another object of the invention to disclose a method as defined above, wherein the intensity of the energy is in a range of 0 dB to 40 dB.

It is another object of the invention to disclose a method as defined above, wherein the energy generator supplies energy frequency in a range of about 0 Hz to about 1,200 Hz.

It is another object of the invention to disclose a method as defined above, wherein the humidity is in a range of 55% to 85%.

It is another object of the invention to disclose a method as defined above, wherein the temperature is in a range of 35.7° C. to 37° C.

It is another object of the invention to disclose a method as defined above, wherein the value of the eggs rolling is tilting of 45 degrees, and the rolling value is in a range of once per hour to once per two hours.

It is thus one object of the present invention to disclose a method of regulating female to male ratio of chicken embryos comprising steps of:
a. providing acoustic/vibration device,
b. defining profile of acoustic/vibration waves,
c. exposing eggs to pre-determined waves profile,
d. altering ratio of female/male embryos production,
e. measuring level of DMRT1 expression in treated eggs,
If DMRT1 expression level equals a designated level, then harvesting the chicken embryos; if DMRT1 expression levels is higher then the designated level, then further exposing the chicken embryos to the waves for an additional time.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1A:
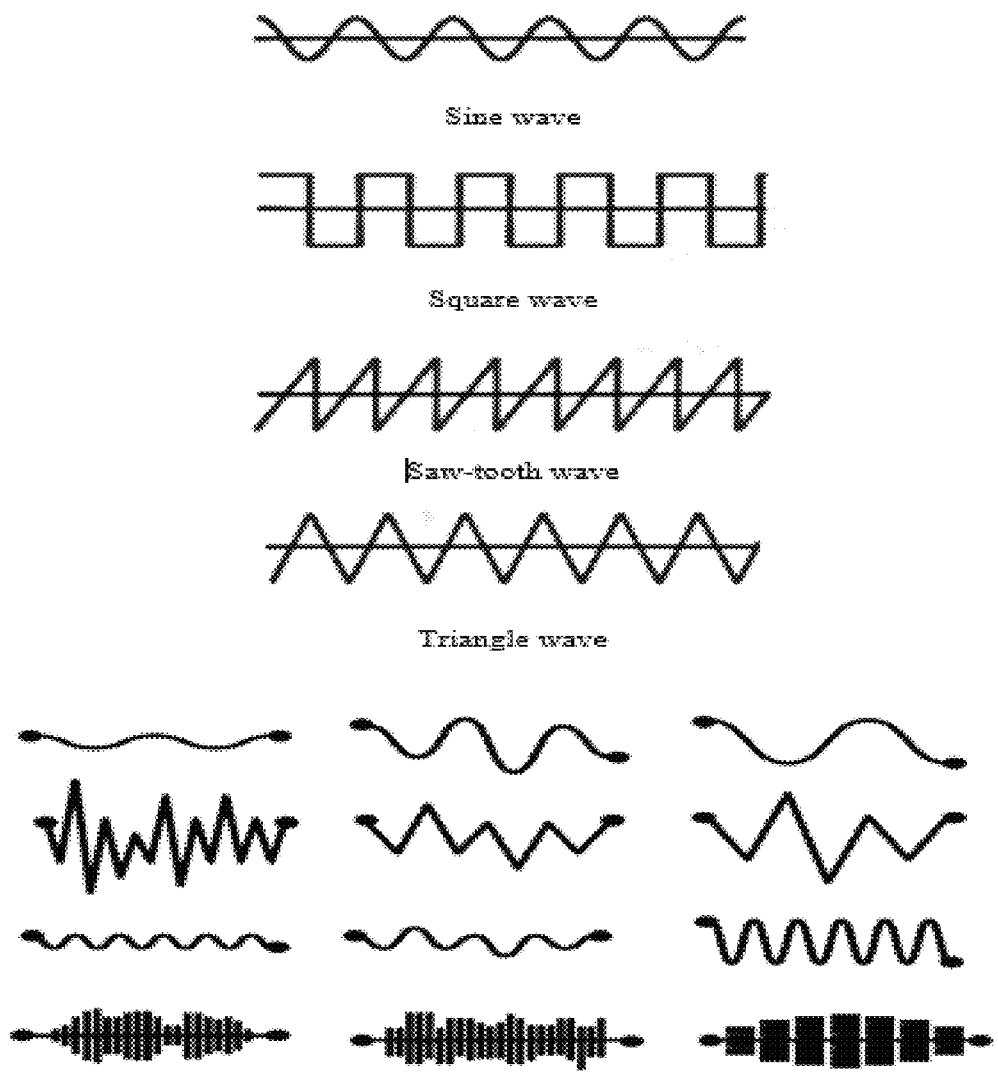
FIG. 1A-B Schematic representation of wave types produced by the sound-generating apparatus.

Reference will now be made in detail to the preferred embodiments of the present invention, examples of which are illustrated in the accompanying drawings. The current invention discloses a technology that affects the differentiation of gender of hen eggs. The current invention creates environmental conditions that affect the gender of the chick in a female direction, and ensure that the percentage of females will be high enough to allow economic gain as a result of feminized embryos. Additionally, higher percentage of female hatching prevents the practice of euthanasia and avoid economic and environmental complications, as a result of the need to incinerate a large amount of biological material.

The term "layer hens" refers hereinafter to chickens farmed primarily to lay eggs for human consumption.

The term "incubation period" refers hereinafter to the process of to the development of the chicken embryo within the egg. Fertile chicken eggs hatch at the end of the incubation period, about 21 days. Development of the embryo starts only when incubation begins, so all chicks hatch within a day or two of each other.

The term "longitudinal waves" refers hereinafter to waves that have the same direction of vibration as their direction of travel. The values describing acoustic waves are sound pressure, particle velocity, particle displacement and sound intensity.

The terms "acoustic waves" or "sound waves" refer hereinafter to a type of longitudinal waves that propagate by means of adiabatic compression and decompression. Acoustic waves travel with the speed of sound which depends on the medium they're passing through. Sound waves are also vibrations in the air.

The terms "compressions and rarefactions", refer hereinafter to the features of a wave, where a compression is a high-density part of the wave, the peak of the wave; and a rarefaction is a low-density part of the wave, the trough of the wave.

The term "wavelength" of the wave refers hereinafter to the distance between two identical parts—from a compression (peak) to the next compression, or from a rarefaction (trough) to the next rarefaction. A wavelength is the length of one full wave, in meters.

The term "frequency" of a sound wave refers hereinafter to the value which discloses the times that a wave passes by in a second. Frequency is measured in Hertz (Hz). For example, 60 Hz the frequency of most TVs, is 60 waves per second. A high frequency sound is a high pitch, while a low frequency sound is a low pitch (like a tuba).

As used hereinafter, the term "acoustic vibration" generally refers hereinafter to sound.

As used hereinafter, the term "physical vibration" generally refers hereinafter to physical movement such as shaking, repeated back-and-forth tilting, repeated gross back-and-forth motion, repeated lateral or vertical motion or repeated movement.

As used hereinafter, the term "pulse" generally refers to a single change of the wave envelope from a baseline value followed by a return to the baseline value.

As used hereinafter, the term "pulse duration" refers to the time interval, t1, between the change from the baseline value and the return to the baseline value.

As used hereinafter, the terms "group of pulses" or "pulse train" refer to a series of at least two pulses, separated in time.

As used hereinafter, the term "pulse separation" refers to the time interval, t2, between two pulses in a pulse train.

As used hereinafter, the term "amplitude pattern" generally refers to the shape of the wave envelope.

As used hereinafter, the term "duty cycle" refers to a fraction of the time in a pulse train during which the pulses occur, or, in other words, the fraction of time during which the wave envelope is different from the baseline value. Duty cycle is hereinafter expressed as either a percentage or as a ratio. Duty cycle can be expressed as: $D=t1/t$; where D is the duty cycle, and the total period of the signal is t, where $t=t1+t2$. Thus, a 60% duty cycle means the signal is on 60% of the time and is off 40% of the time.

The term "about" refers to any value being up to 20% lower or greater the defined measure.

Specifically, the current invention discloses a method for increasing percentage of female embryos in layer hens, by a synergistic combination of factors emitted during 21 days of incubation. These factors include, inter alia light, humidity, temperature, duration and angle of egg tilting and rolling, spacing between eggs' shelves, energy pulses (sound, vibration, light etc.), duration of the energy pulses, frequency and pattern of these pulses.

In general, the current invention revealed that the aforementioned factors affecting syngerstically the differentiation of hen embryos towards a majority of females are:
  a. Temperature range—temperature range of incubated eggs ranges from 35.7 degrees Celsius to 37.7 degrees Celsius,
  b. moisture or humidity,
  c. type of energy: sound, light or vibration or any combination,
  d. the exposure level of the energy of (c),
  e. the frequency or wavelength of the energy of (c),
  f. transmission time of the energy of (c),
  g. the distribution of the frequency in space of the energy of (c),
  h. the distance between the eggs,
  i. accurate humidity,
  j. accurate temperature,
  k. automatic rotation or tilting of eggs,
  l. exposure to energy only during the first 14 days of incubation—exposing all the time for 18 consecutive days is not effective, since on the 14th day the differentiation of sex ends. Moreover, exposure to the frequency after day 14 causes fetal mortality.

The energy generated and applied of fertilized eggs comprises, inter alia, sound, acoustic vibration, physical vibration, light, gravitational, sonic, magnetic, electromagnetic, solar, ionization, or thermal energy, and any combination thereof.

The non-energy parameters applied on these fertilized eggs comprise, inter alia distance between the eggs, humidity, temperature, automatic tilting of eggs, and any combination thereof.

The current invention discloses a method for promoting production of female embryos of fertilized eggs, while the method comprising steps of: incubating said eggs; generating at least one type of energy with a predetermined energy profile by means of an energy generation device; and simultaneously generating a pre-determined profile of a non-energy parameter; applying said energy profile and said non-energy parameter to said eggs; and harvesting the fertilized eggs. The novelty of the current invention is being non-toxic to the embryos, and that application of both energy application profile and said non-energy parameter synergistically increases the fraction of females in the hatched chicks.

The technology underlines that the vibration caused using sound waves, along with changes in humidity and temperature, inhibits the DMRT1 gene responsible for sex differentiation. Suppression of this gene causes a female to hatch and increasing this gene will cause a male to hatch. Experiments conducted by microbiological methods on chicken embryos, proved that it is possible to change species in chicken embryos.

The energy profile is at least one parameter selected from a group consisting intensity of said energy, duration of said energy, frequency of pulses of said energy, duty cycle, shape of said pulse, number of pulses per a group, number of group of pulses, duration of said group, wavelength of a pulse, wavelength of said energy, shape of said group, and any combination thereof.

The envelope of a pulse can have a constant amplitude, or the amplitude can vary. The amplitude or a pulse can increase with time, decrease with time, and any combination thereof. Preferably, pulses have a constant amplitude.

In a pulse train, the individual pulses can be separated by a fixed time interval, or the time interval between adjacent pulses can be different for at least two sets of adjacent pulses.

The durations of the pulses can be the same, or at least two pulses can have different durations. All the pulses can have the same amplitude pattern, or at least two pulses can have different amplitude patterns.

A pulse train with constant pulse duration and constant pulse separation can be defined by its mark-space ratio, i.e. the ratio of the pulse duration, t1, to the pulse separation, t2, and by its pulse repetition frequency, 1/(t1+t2).

The shape of said pulse is at least one selected from a group consisting of a sinusoidal wave, a square wave, a saw-tooth wave, sinusoid-like wave, a triangle wave, a descending wave, an elevating wave, a multivariable wave and any combination thereof. The emission profile is at least one selected from a group consisting of continuous, interrupted, and any combination thereof.

Figure 1B:
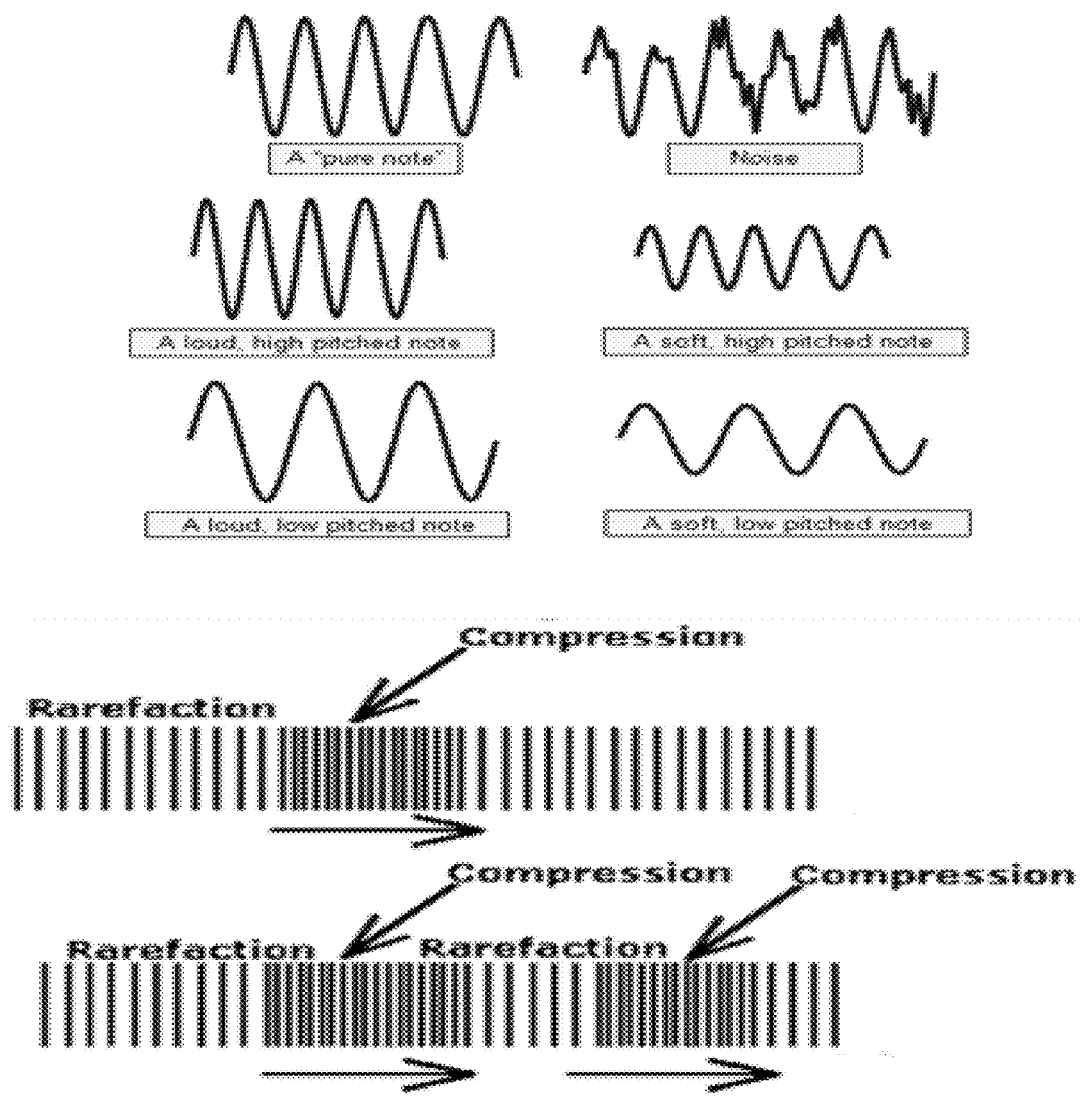
Figure 2A:
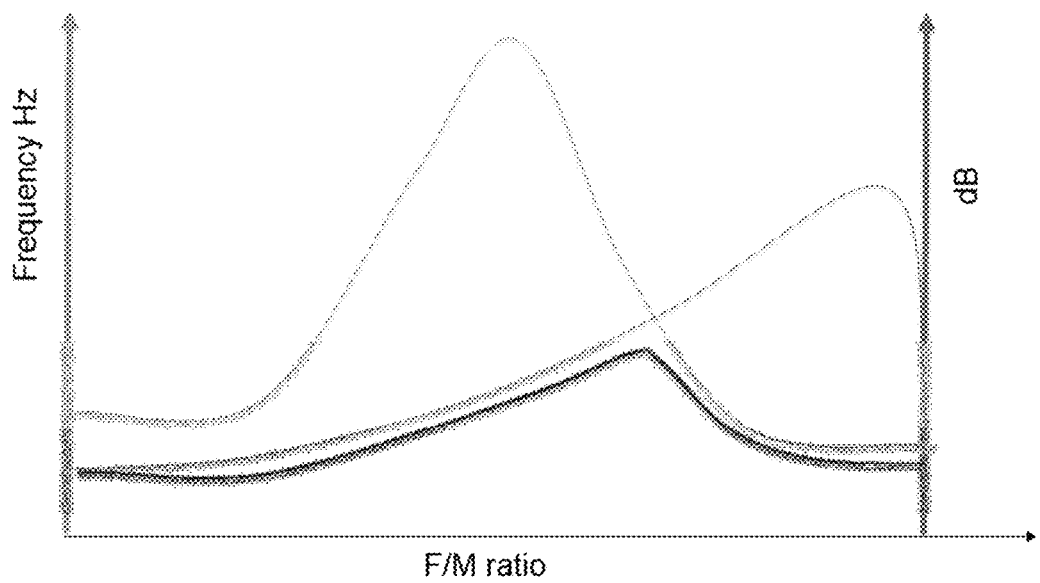
FIG. 2A-B The female to male ratio (F/M ratio) as a function of the combination of both frequency and intensity of energy pulses.
Figure 2B:
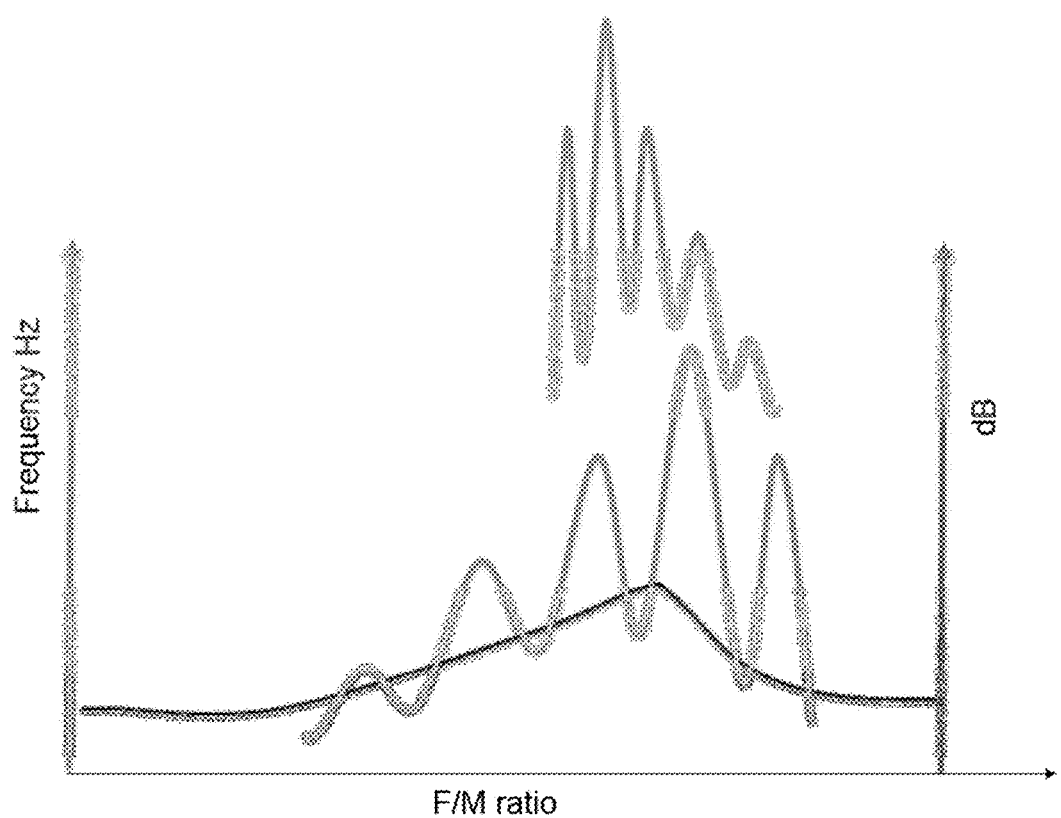

The shape of the group of pulses is at least one selected from a group consisting of a sinusoidal wave, a square wave, a saw-tooth wave, sinusoid-like form, a triangle wave, a decreasing intensity wave, an increasing intensity wave, a multivariable wave, propagating longitudinal waves comprising alternating compressions and rarefactions, and any combination thereof, see FIG. 1A-B. The duration of the group is in a range of 0 hours to 48 hours. All of the groups are applied on a day in a range of day 1 to day 14 of incubation. A non-limiting example is the combination of both frequency and intensity of energy pulses, affect the female to male ratio (F/M ratio), see FIG. 2 A-B.

Example 1

In this control test, fertilized eggs were incubated in temperature range of 37 to 38° C.; humidity of 35 to 60% and 45° tilt, tilting every 60 to every 110 minutes. The yield is 50% females and 50% males; hence, no promoted production of female embryos of fertilized eggs was detected.

Example 2

Chicken eggs were placed in the incubator. During the incubation process (21 days), the eggs were exposed to various parameters in the hatchery, which comprise, inter alia, the humidity level, the temperature and the transmission of energy waves according to a pre-determined profile.

At the end of the 21-day incubation period, the eggs were hatched, the chicks were sorted, screened and examined for their gender (or "sex") by their wing feathers, using the sex-linked slow/fast feathering. Further genetic analysis was performed on selected chicks, see Example 5.

The females were transferred to a chicken coop for research and breeding needs until the laying stage. After another 120 days, the females were transferred to the laying hen. The egg-laying rate observed in these females was the same as that of other coppers in the chicken coop in quantity and quality (monitored and in individual cages).

The studies performed revealed the aforementioned preferred settings:

a. Energy distribution should be fragmented during the first 14 days of incubation only, 2 to 14 days in which sex differentiation occurs (in the first two weeks only). Thus, the energy transmission takes place at regular intervals rather than on a continuous basis, because continuous and constant transmission causes embryo mortality;

b. Energy administration after day 14 causes increased embryo mortality; and c. The intensity of the energy is adjusted according to the size of the incubator and the quantity of eggs.

A non-limiting example discloses that during the 14 days of incubation, sound waves are transmitted at certain frequencies through the transmitter installed in the incubator, and the transmitted sound waves range from 700 MHz to 1,200 MHz and are transmitted in a fragmented manner.

It was found that a temperature lower than normal and higher than normal humidity lead to a higher percentage of females. The temperature is set to 35.7 to 37.7 degrees Celsius, where the temperature in the incubator is usually 37 degrees Celsius and 37.6 degrees Celsius. While the humidity in incubators is usually 40 to 55 percent humidity, the current invention discloses that humidity at a higher than normal rate of 55 to 60 percent humidity, combined with lower temperature, allows for a higher percentage of females.

The optimal conditions for producing 60-70% females are detailed in Table 1.

TABLE 1

Optimal conditions for production of increased female ratio

| Humidity | Temperature | Sound Frequency | Sound Intensity | Eggs tilting |
|---|---|---|---|---|
| 45-86% | 35.7-37.7° C. | 300-1570 Hz | 20-40 db | 45° tilt, every 60 min to every 150 min |

The studies were performed, in a non-limiting matter, on three strains of chickens, Lohmann White, Hy Line and DeKalb. The results of the studies are summarized in Table 2.

TABLE 2

Results of studies promoting female embryos

| Study Number | Strain | Total number of eggs | Number of fertile eggs | Total hatching | Total males | Total females |
|---|---|---|---|---|---|---|
| 1 | DeKalb | 597 | 458 | 398 (67%) | 163 (41)% | 235 (59)% |
| 2 | Hy Line | 149 | 134 | 111 (74.5%) | 43 (39%) | 68 (61%) |
| 3 | Hy Line | 150 | 132 | 112 (75%) | 45 (40%) | 67 (60%) |
| 4 | Lohmann White | 900 | 819 | 262 (32%) | 75 (29%) | 187 (71%) |

TABLE 2-continued

Results of studies promoting female embryos

| Study Number | Strain | Total number of eggs | Number of fertile eggs | Total hatching | Total males | Total females |
|---|---|---|---|---|---|---|
| 5 | Lohmann White | 357 | 328 | 200 (61%) | 60 (30%) | 140 (70%) |
| 6 | Lohmann White | 878 | 804 | 596 (74%) | 161 (27%) | 435 (73%) |

Example 3

This set of studies (studies 1-6) was conducted in two protocols. In studies 1 and 3, a maximum of 900 eggs were placed on three levels of trays, each containing about 300 eggs.

The conditions for EXAMPLE 3 are as follows: humidity alternation in a range of about (±12.5%) 86% to about (±7.5%) 45%. Temperature ranges from about 35.9 C to about 37.9 C. For days 3-15, the protocol of starting emitting sound pulses (frequency ±50 Hz)=$0.0032*day^6 - 0.1428*day^5 + 2.5087*day^4 - 22.139*day^3 + 104.69*day^2 - 255.88*day + 866.22$, $R^2=0.87$. Eggs tilting protocol varies from about 30° to about 60°, about 1/60 to about 1/150 minutes. Sound intensity varies from 19 to 42 dB.

For days 3-13, the protocol of starting emitting sound pulses (frequency ±50 Hz)=$y=-0.0554\ day^6 + 2.6917\ day^5 - 52.609\ day^4 + 527.75\ day^3 - 2850.3\ day^2 + 7794.1\ day - 7792.3$ $R^2=0.911$; Eggs tilting protocol varies from about 30° to about 60°, about 1/60 to about 1/150 minutes. Sound intensity varies from 19 to 42 dB.

This study revealed a large difference in the percentage of hatching was observed between the top and bottom tray versus the middle—the middle tray suffered from low hatching rates. The reasons for the low hatch in the middle tray can be due to several reasons: less ventilation due to the fan in the hatch, receiving frequencies from the top and bottom tray, and possibly a number of factors causing the middle tray to function less well. In addition, abnormal fetal mortality was observed at a later age.

The setup of study was: one tray was inserted into the industrial incubator, and eggs were incubated in the domestic incubator for control. In this experiment too, fetal mortality was observed at an older age.

Example 4

Sex in birds is chromosomally based (ZZ male, ZW female). Genetic tests were performed on the embryos to ascertain whether the intervention caused the death of the fetuses, and whether there was a correlation between the number of females living and those who died. Genetic tests were also performed on several chickens to ascertain if a sex reversal occurred. The genetic tests included DNA tissue isolation and gender diagnosis of previously morphologically diagnosed chicks. The genetic tests revealed that the sex chromosomes of the tested chicks were normal and included ZZ for males and ZW for females.

So far, no sex reversal has been observed in the chicks.

Example 5

DMRT1 is an avian Z-linked gene that shows higher expression in male gonads during embryogenesis and has been proposed as a putative testis-determining gene in birds. In the chicken embryo, DMRT1 is expressed in the developing gonads of both sexes but, being Z-linked, is more highly expressed in males versus females. The DMRT1 gene expression is examined by relative quantitative reverse transcription PCR (RQ RT-PCR), using double-stranded DNA detection and real time PCR.

A non-limiting example additionally discloses a method of regulating female to male ratio of chicken embryos comprising steps of:
  f. providing an energy generation device (for example an acoustic or a vibration device) device;
  g. defining desired profiles of both non-energy and energy parameters;
  h. incubating the fertilized eggs and exposing the eggs simultaneously to pre-determined profiles of both non-energy and energy parameters;
  i. altering ratio of female/male embryos production;
  j. measuring level of DMRT1 expression in treated exposed eggs;
  If DMRT1 expression level equals a designated level, then harvesting said chicken embryos; if DMRT1 expression levels is higher then said designated level, then further exposing said chicken embryos to said pre-defined profiles for an additional time (see FIG. 2).

Figure 3:
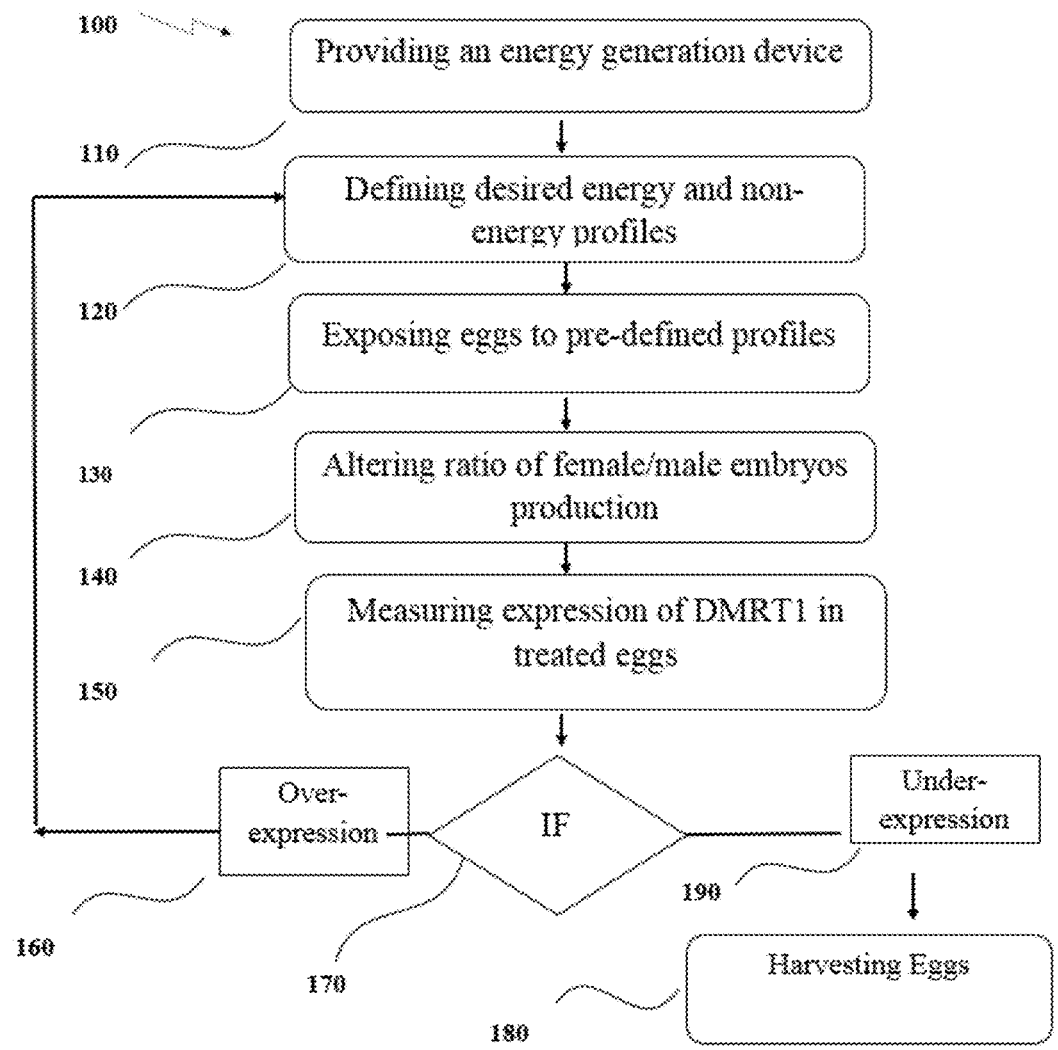
FIG. 3 Illustration of a method for regulating gender of chicken.

Reference is now made to FIG. 3, which illustrates a method 100 for regulating gender of chicken.

Step 110 includes providing an energy generation device. Step 120 includes defining a desired energy and a non-energy profiles. Step 130 includes exposing eggs to predefined profiles. Step 140 includes altering ratio of female/male embryos production. Step 150 includes measuring an expression of DMRT1 in targeted eggs. In step 170—if under expression of DMRT1 is determined (step 190) then the eggs are harvested (step 180). In step 170—if over expression of DMRT1 is determined (step 160) then step 120 is performed.

The invention claimed is:

1. A method for promoting production of female embryos of fertilized eggs, said method comprising steps of:
  a. incubating said eggs;
  b. by means of an acoustic waves generation device, generating a predetermined acoustic waves profile; and simultaneously generating a pre-determined profile of a non-energy parameter;
  c. applying said acoustic waves profile and said non-energy parameter to said eggs; and,
  d. harvesting said eggs;
  wherein said method is non-toxic to the embryos, further wherein application of both said acoustic profile and said non-energy parameter increases a fraction of females in chicks hatched from the harvested eggs.

2. The method of claim 1, wherein said energy profile and said non-energy profile are characterized by:
  a. alternating humidity in a range of αA to βB, α ranges from 0.85-1.25; β ranges from 0.73-1.35; AB ratio ranges from 34 to 65%, from 92% to 42%, from 86% to 26% or from 63% to 12%;
  b. alternating temperature in a range of 35.9 C to 37.9 C;

c. for days 3-15, alternating sound frequency (±50 Hz) wherein said sound frequency equals $=0.0032*day^6-0.1428*day^5+2.5087*day^4-22.139*day^3+104.69*day^2-255.88*day+866.22$;

d. alternating sound intensity in a range of 19 to 42 dB; and e. tilting said eggs in a first range of 30° to 60°, and a second range of once every 60 min. to 150 mins.

3. The method of claim 1, wherein said energy profile and said non-energy profile are characterized by:

a. alternating humidity in a range of αA to βB, α ranges from 0.85-1.25; β ranges from 0.73-1.35; AB ratio ranges from 34 to 65%, from 92% to 42%, from 86% to 26% or from 63% to 12%;

b. alternating temperature in a range of 35.9 C to 37.9 C;

c. for days 3-13, alternating sound frequency (±50 Hz) wherein said sound frequency equals $-0.0554\ day^6+2.6917\ day^5-52.609\ day^4+527.75\ day^3-2850.3\ day^2+7794.1\ day-7792.3$;

d. alternating sound intensity in a range of 19 to 42 dB; and e. tilting said eggs in a first range of 30° to 60°, and a second range of once every 60 min. to 150 mins.

4. The method of claim 3, wherein a value of said eggs rolling is tilting of 45 degrees, and said rolling value is in a second range of once per hour to once per two hours.

5. The method of claim 1, wherein at least one parameter of said acoustic waves profile is selected from a group consisting of intensity, duration, frequency of pulses of said acoustic waves, duty cycle, shape of said pulses of said acoustic waves, number of pulses per a group, number of group of pulses, duration of said group, and any combination thereof.

6. The method of claim 5, wherein said shape of said pulse is at least one selected from a group consisting of a sinusoidal wave, a square wave, a saw-tooth wave, sinusoid-like wave, a triangle wave, a descending wave, an elevating wave, a multivariable wave, propagating longitudinal waves comprising alternating compressions and rarefactions and any combination thereof.

7. The method of claim 5, wherein said shape of said group of pulses is at least one selected from a group consisting of a sinusoidal wave, a square wave, a saw-tooth wave, sinusoid-like form, a triangle wave, a decreasing intensity wave, an increasing intensity wave, a multivariable wave and any combination thereof.

8. The method of claim 5, wherein said duration of said group is in a range of 0 hours to 48 hours.

9. The method of claim 5, wherein all of said parameters are applied on a day in a range of day 1 to day 14 of incubation.

10. The method of claim 1, wherein said non-energy parameter is selected from a group consisting of humidity, temperature, eggs' tilting, eggs rolling, shelves' spacing and any combination thereof.

11. The method of claim 10, wherein said humidity is in a range of 55% to 85%.

12. The method of claim 10, wherein said temperature is in a range of 35.9° C. to 37° C.

13. The method of claim 1, wherein said acoustic waves profile is continuous or interrupted.

14. The method of claim 1, wherein an intensity of said acoustic waves is in a range of 0 dB to 40 dB.

15. The method of claim 1, wherein said acoustic waves generation device supplies acoustic waves frequency in a range of about 0 Hz to about 1,200 Hz.

16. A method of regulating female to male ratio of chicken embryos comprising steps of:

a. providing an acoustic/vibration device, b. defining a profile of acoustic/vibration waves, c. exposing eggs to the defined waves profile, d. measuring a level of Doublesex and Mab-3 Related Transcription Factor, #1 (DMRT1) expression in treated eggs, wherein, if the DMRT1 expression level is equal to or below a designated level, then harvesting said chicken embryos; if DMRT1 expression levels is higher than said designated level, then further exposing said chicken embryos to said waves for an additional time, thereby altering a ratio of female/male embryos production.

* * * * *